(12) United States Patent
Beer et al.

(10) Patent No.: US 9,744,954 B2
(45) Date of Patent: Aug. 29, 2017

(54) BRAKE ACTUATION SYSTEM

(71) Applicant: Continental Teves AG & Co. oHG, Frankfurt (DE)

(72) Inventors: Wilhelm Beer, Rüsselsheim (DE); Bianca Stauzebach, Liederbach am Taunus (DE); Patrick Schlitt, Schlitz (DE); Johannes Both, Mainz (DE)

(73) Assignee: Continental Teves Ag & Co. oHG (DE)

( * ) Notice: Subject to any disclaimer, the term of this patent is extended or adjusted under 35 U.S.C. 154(b) by 0 days.

(21) Appl. No.: 14/891,790

(22) PCT Filed: Jun. 3, 2014

(86) PCT No.: PCT/EP2014/061463
§ 371 (c)(1),
(2) Date: Nov. 17, 2015

(87) PCT Pub. No.: WO2014/195300
PCT Pub. Date: Dec. 11, 2014

(65) Prior Publication Data
US 2016/0107624 A1 Apr. 21, 2016

(30) Foreign Application Priority Data

Jun. 3, 2013 (DE) .................. 10 2013 210 275
Jul. 8, 2013 (DE) .................. 10 2013 213 324

(51) Int. Cl.
*B60T 8/26* (2006.01)
*B62L 3/08* (2006.01)
(Continued)

(52) U.S. Cl.
CPC .............. *B60T 8/261* (2013.01); *B60T 7/085* (2013.01); *B60T 7/102* (2013.01); *B60T 11/20* (2013.01); *B62L 3/023* (2013.01); *B62L 3/08* (2013.01)

(58) Field of Classification Search
CPC .......... B60T 8/261; B60T 7/102; B60T 7/085; B62L 3/023; B62L 3/08
See application file for complete search history.

(56) References Cited

U.S. PATENT DOCUMENTS

| 4,465,322 A | 8/1984 | Hayashi |
| 4,598,954 A | 7/1986 | Hayashi |

(Continued)

FOREIGN PATENT DOCUMENTS

| CA | 2544196 | 10/2007 |
| CN | 101277857 A | 10/2008 |

(Continued)

OTHER PUBLICATIONS

German Search Report mailed Jan. 13, 2014 in German Application No. 10 2013 213 324.3, including partial translation.

(Continued)

*Primary Examiner* — Vishal Sahni
(74) *Attorney, Agent, or Firm* — RatnerPrestia

(57) ABSTRACT

A brake actuation system of a hydraulic brake system, for actuating at least one front axle brake circuit having at least one front wheel brake, and for actuating at least one rear axle brake circuit having at least one rear wheel brake, the brake actuation system including at least one hand brake module which, when actuated, can activate both brake circuits. In order to provide an improved brake actuation system with a plurality of actuation capabilities, which system can also be utilized in light motorcycles and scooters without the restrictions of existing brake actuation systems, while simultaneously offering a simple concept and a reduced cost and weight, the hand brake module is hydraulically coupled into a combined hand brake module, the combined hand brake module being designed to simultaneously generate brake pressure in both brake circuits.

6 Claims, 5 Drawing Sheets

(51) Int. Cl.
*B60T 11/20* (2006.01)
*B62L 3/02* (2006.01)
*B60T 7/08* (2006.01)
*B60T 7/10* (2006.01)

(56) References Cited

U.S. PATENT DOCUMENTS

| | | | |
|---|---|---|---|
| 8,010,273 | B2 | 8/2011 | Vourch et al. |
| 2007/0273200 | A1 | 11/2007 | Pongo |
| 2012/0145493 | A1* | 6/2012 | Nishikawa ............... B60T 7/042 |
| | | | 188/152 |
| 2014/0131131 | A1* | 5/2014 | Marois .................... B62J 25/00 |
| | | | 180/316 |

FOREIGN PATENT DOCUMENTS

| | | | |
|---|---|---|---|
| DE | 10158382 | | 6/2003 |
| DE | 102013219575 | | 4/2014 |
| EP | 1520763 | * | 4/2005 |
| EP | 1757504 | * | 2/2007 |
| EP | 2055625 | * | 5/2009 |
| FR | 2843349 | | 2/2004 |
| JP | 09309481 | | 12/1997 |
| JP | 10273087 | | 10/1998 |

OTHER PUBLICATIONS

International Search Report for International Application No. PCT/EP2014/061463 mailed Jul. 28, 2015.
Chinese Office Action for Chinese Application No. 201480031427.6, dated May 2, 2017, including English translation, 13 pages.

* cited by examiner

BRAKE ACTUATION SYSTEM

CROSS REFERENCE TO RELATED APPLICATIONS

This application is the U.S. National Phase Application of PCT International Application No. PCT/EP2014/061463, filed Jun. 3, 2014, which claims priority to German Patent Application No. 10 2013 210 275.5, filed Jun. 3, 2013 and German Patent Application No. 10 2013 213 324.3, filed Jul. 8, 2013, the contents of such applications being incorporated by reference herein.

FIELD OF THE INVENTION

The invention concerns a brake actuation system, in particular for a brake system of a motorized cycle.

BACKGROUND OF THE INVENTION

To increase traffic safety, motorized cycles such as motorcycles, scooters, quad bikes, trikes, light motorcycles and comparable vehicles, are increasingly being equipped with combination brakes and in some cases anti-lock braking systems which, in any actuation variant, can act on the front wheels and on the rear wheels simultaneously and comprise a plurality of brake circuits.

Brake actuation systems with multiple actuation possibilities are known, which comprise a hydraulic connection of the foot brake to the handbrake or vice versa.

It is not however possible, sensible or desirable to implement such brake systems in many areas of application, such as for example lightweight motorcycles, for construction reasons. Also the weight, space required, complexity and cost-intensity of the known brake actuation systems are worthy of improvement.

SUMMARY OF THE INVENTION

An aspect of the invention is an improved brake actuation system with multiple actuation possibilities, which can be used also on light motorcycles and scooters without the restrictions of the known brake actuation systems, and which at the same time offers simple packaging and a cost- and weight-saving.

BRIEF DESCRIPTION OF THE DRAWINGS

Details, features, advantages and possible uses of the invention arise from the description below, with reference to the drawings. These show.

DETAILED DESCRIPTION OF THE PREFERRED EMBODIMENTS

FIG. 1

Figure 1:
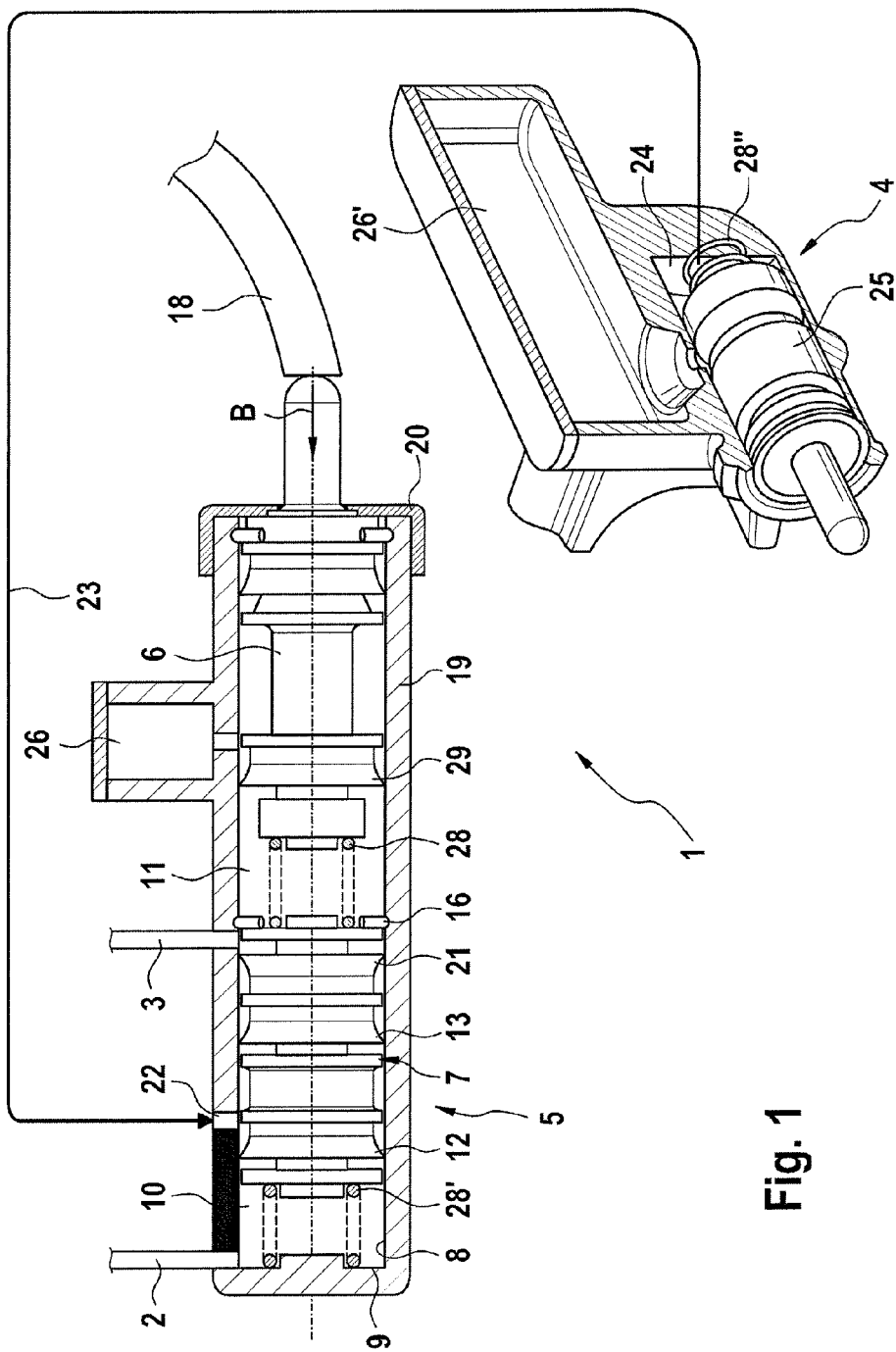
FIG. 1 an embodiment of a brake actuation system according to the invention.

An embodiment of the brake actuation system 1 according to the invention has a combination handbrake module 5, which comprises an approximately cylindrical housing 19 with a piston bore 8 therein filled with a pressure medium and having a floor 9. An actuating piston 6, which can be actuated manually by a hand lever 18, is arranged in the piston bore 8 so as to be guided displaceably in an actuation direction B. A sealing collar 29, which allows a fluid flow in the direction of the floor 9, is mounted on the actuating piston 6, whereby pressure can be built up on movement of the actuating piston 6 in the piston bore 8 in the actuation direction B. A centrally perforated cover 20 serves to close the housing 19.

A floating piston 7 is positioned in the piston bore 8 between the actuating piston 6 and the floor 9. The floating piston 7 is arranged displaceably in the actuation direction B and is elastically tensioned between the floor 9 and the actuating piston 6; it has a plurality of direction-dependent sealing collars 12, 13, 21 and divides the piston bore 8 into two pressure chambers 10 and 11, wherein the first pressure chamber 10 is delimited between the floor 9 and the floating piston 7 and is hydraulically connected via a port to a front axle brake circuit 2, and the second pressure chamber 11 is delimited between the floating piston 7 and the pressure piston 6 and is hydraulically connected via another port to a rear axle brake circuit 3. If required, the allocation of the pressure chambers to the brake circuits may also be reversed within the invention.

Two elastic elements 28 and 28' formed as coil springs are arranged pretensioned between the floor 9 and the floating piston 7, and between the floating piston 7 and the actuating piston 6 respectively, and serve in particular to return the moved piston to its respective unactuated starting position. In addition, the floating piston 7 is pressed by the elastic element 28' against a stop 16 protruding into the piston bore 8, which is formed in the embodiment shown as a clamping ring engaging in a groove. Evidently, further embodiments for performing the same function are permitted within the invention for both the elastic elements 28, 28' and for the stop 16.

The sealing collars 12 and 13 are arranged on the floating piston 7 spaced apart from each other and oriented in the same direction, allowing flow in the direction of the pressure chamber 10 and sealing in the opposite direction, whereas the sealing collar 21 is arranged allowing flow in the direction of pressure chamber 11, on the end of the floating piston 7 facing the pressure chamber 11.

In a region of the piston bore 8 lying between the sealing collars 12 and 13, a hydraulic port 22 is provided for connection of a simple conventional handbrake module 4, wherein a pressure chamber 24 of the handbrake module 4 is connected via a hydraulic line 23 to said port 22. The conventional handbrake module 4 is fitted with a single piston 25 which is also actuated manually by means of a hand lever, acts on the pressure chamber 24 and is elastically pretensioned to return by an elastic spring element 28".

Furthermore, both the combination handbrake module 5 and the simple handbrake module 4 each have an integrated pressure medium reservoir 26, 26' for supplying the pressure chambers 10, 11, 24 with pressure medium. Evidently, within the invention, embodiments are possible with merely one pressure medium reservoir which is connected to at least one of the handbrake modules 4, 5 via at least one hydraulic connecting line, not shown in the figure.

When this simple handbrake module 4 is actuated, the pressure medium flows out of the pressure chamber 24 through the line 23 and port 22, into the intermediate space delimited by the similarly oriented sealing collars 12 and 13 around the floating piston 7 in the combination handbrake module 5. This pressure medium flows over the sealing collar 12 lying closest to the floor 9 and at the same time moves the floating piston 7 in the direction of the actuating piston 6 via the sealing collar 13 which seals in this direction. In this way, the same pressure is set in both pressure chambers 10 and 11, and in the brake circuits 2 and 3 connected thereto, as in the pressure chamber 24.

If the combination handbrake module 5 is actuated in addition or exclusively, the actuating piston 6 moves in the direction of the floor 9. At its end facing the actuating piston 6, the floating piston 7 has the sealing collar 21 which seals in the direction of the floor 9. Thus, on movement of the actuating piston 6, the floating piston 7 is also moved by half the travel distance of the actuating piston 6, so that the pressure is built up simultaneously in pressure chambers 10, 11, 24 and in the brake circuits 2, 3. On failure of the front axle brake circuit 2, the floating piston 7 goes to stop on the floor 9, whereby pressure can continue to be built up in the pressure chambers 11 and the rear axle brake circuit 3, but with an extended travel of the actuating piston 6. On failure of the rear axle brake circuit 3, the actuating piston 6 goes to stop on the floating piston 7, so that pressure can continue to be built up in the pressure chamber 10 and the front axle brake circuit 2.

Even on failure of all three sealing collars 12, 13 and 21, an even pressure build-up and pressure distribution in the two brake circuits 2, 3 is still possible through the handbrake module 4 alone.

The embodiment of the combination handbrake module 5 shown has a hydraulic connection for two brake circuits 2, 3, which are hydraulically connected to the pressure chambers 10 and 11 respectively. A design with a single connected brake circuit would however also be possible within the invention, for example by omitting the floating piston 7 and one of the brake circuits.

FIG. 2

The brake actuation system 1 described above is incorporated in a hydraulic brake system 100. In the embodiment according to the invention shown, the brake system 100 has a front wheel brake 14 connected to the front axle brake circuit 2, and a rear wheel brake 15 connected to the rear axle brake circuit 3, so that the two wheel brakes 14 are directly connected hydraulically to the respective pressure chambers 10 and 11 in the combination handbrake module 5.

The brake actuation system 1 according to the invention can thus be used particularly easily for two-wheeled motor vehicles (motorbikes, scooters etc.) but also for unmotorized vehicles such as bicycles without ABS. For this, the combination handbrake module 5 and the simple handbrake module 4 are connected together by the hydraulic line 23 and attached to a handlebar 27 of the vehicle in an ergonomically favorable fashion.

The reduction in components compared with the known brake actuation systems means that fewer costs are incurred for the components themselves, the fixing to the vehicle, and for the hydraulic connecting elements. As well as the advantages cited above, this also leads to simple packaging and a weight saving.

FIG. 3

Figure 2:
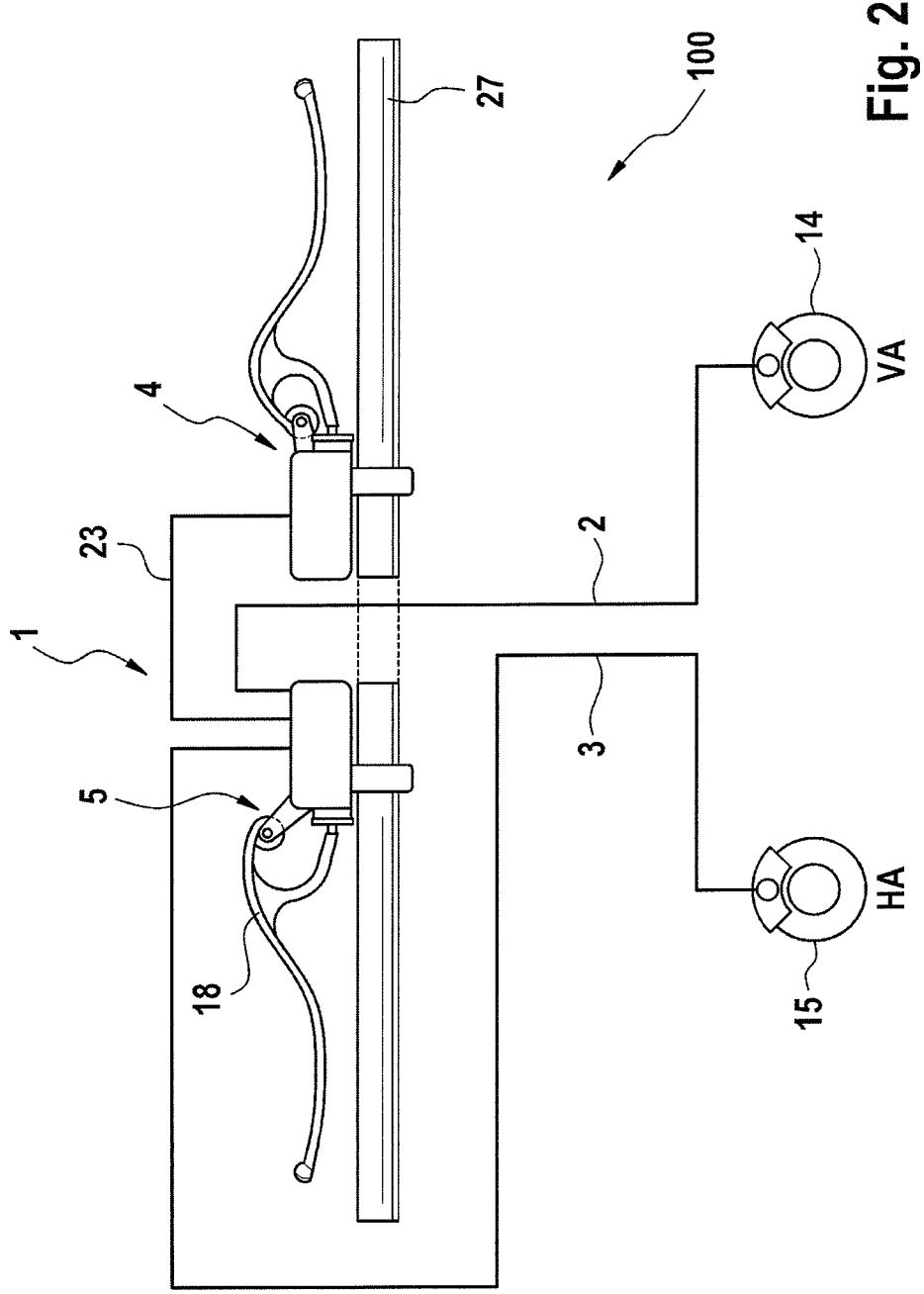
FIG. 2 a simplified sketch of an embodiment according to the invention with a tandem hand actuation facility (for example for a two-wheeled vehicle).
Figure 3:
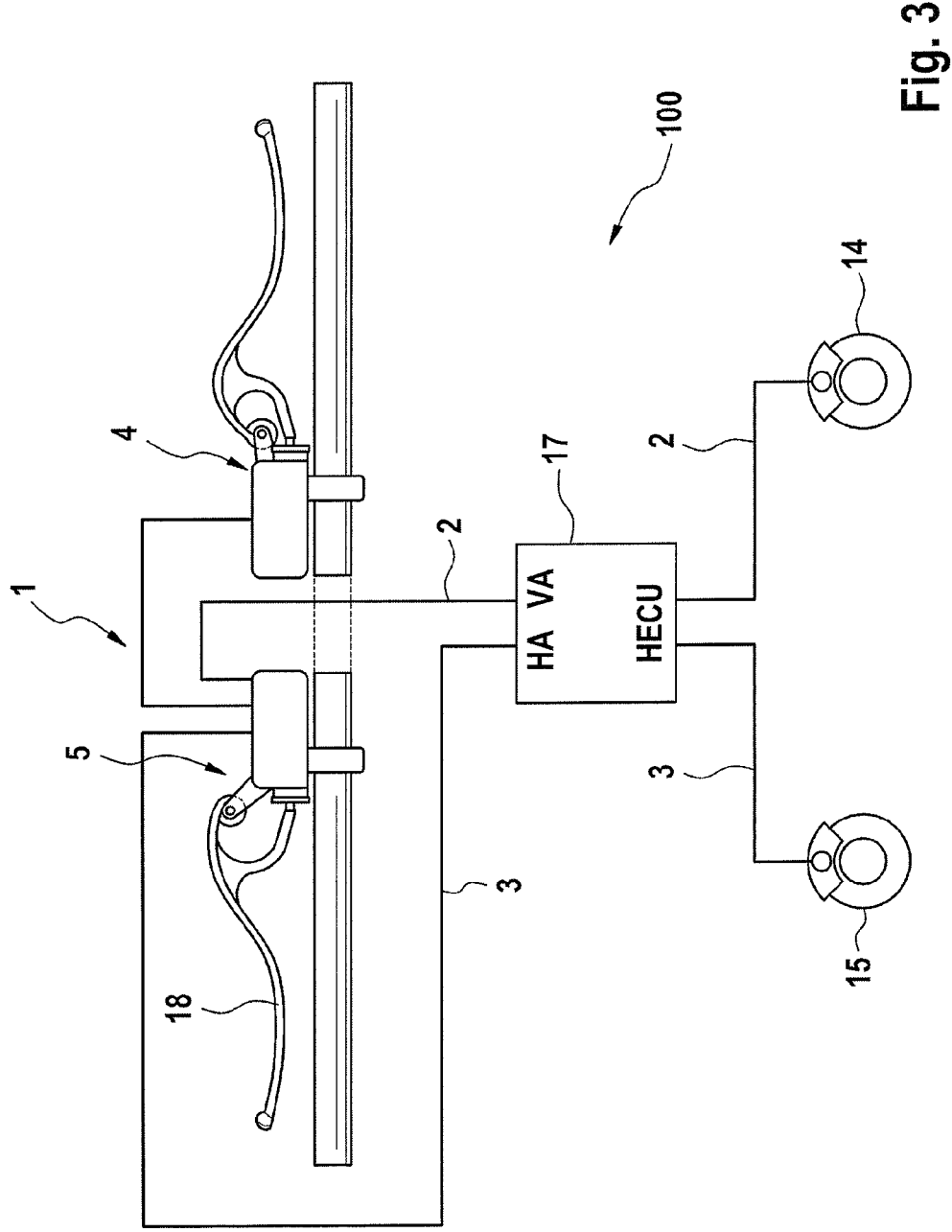
FIG. 3 a sketch of a further embodiment according to the invention with a tandem hand actuation facility for a two-wheeled vehicle as in FIG. 2, but with an interposed hydraulic-electronic control unit, for example an ABS unit.
Figure 4:
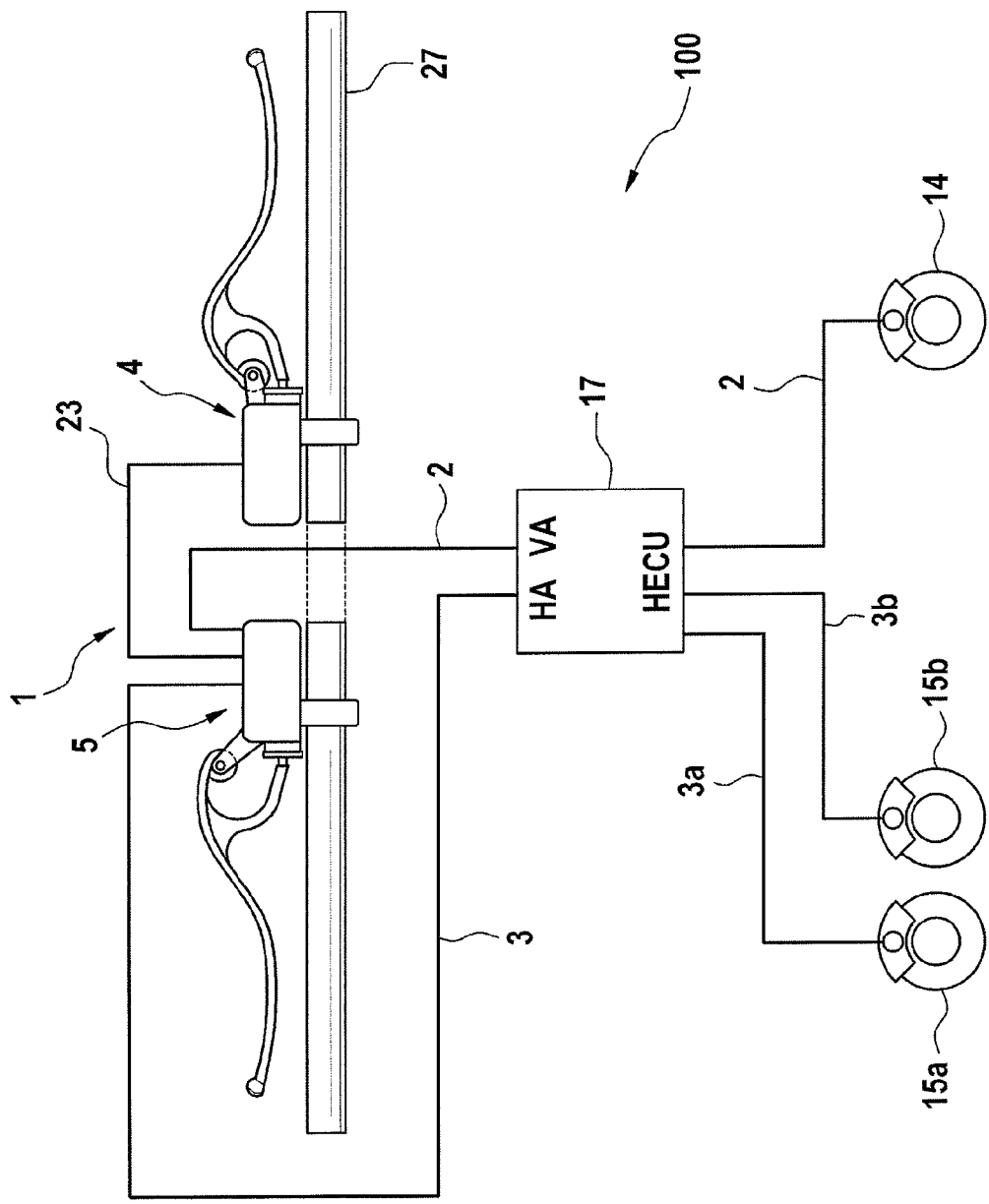
FIG. 4 a sketch of a further embodiment according to the invention with a tandem hand actuation facility for a three-wheeled vehicle, with an interposed hydraulic-electronic control unit, for example an ABS unit.
Figure 5:
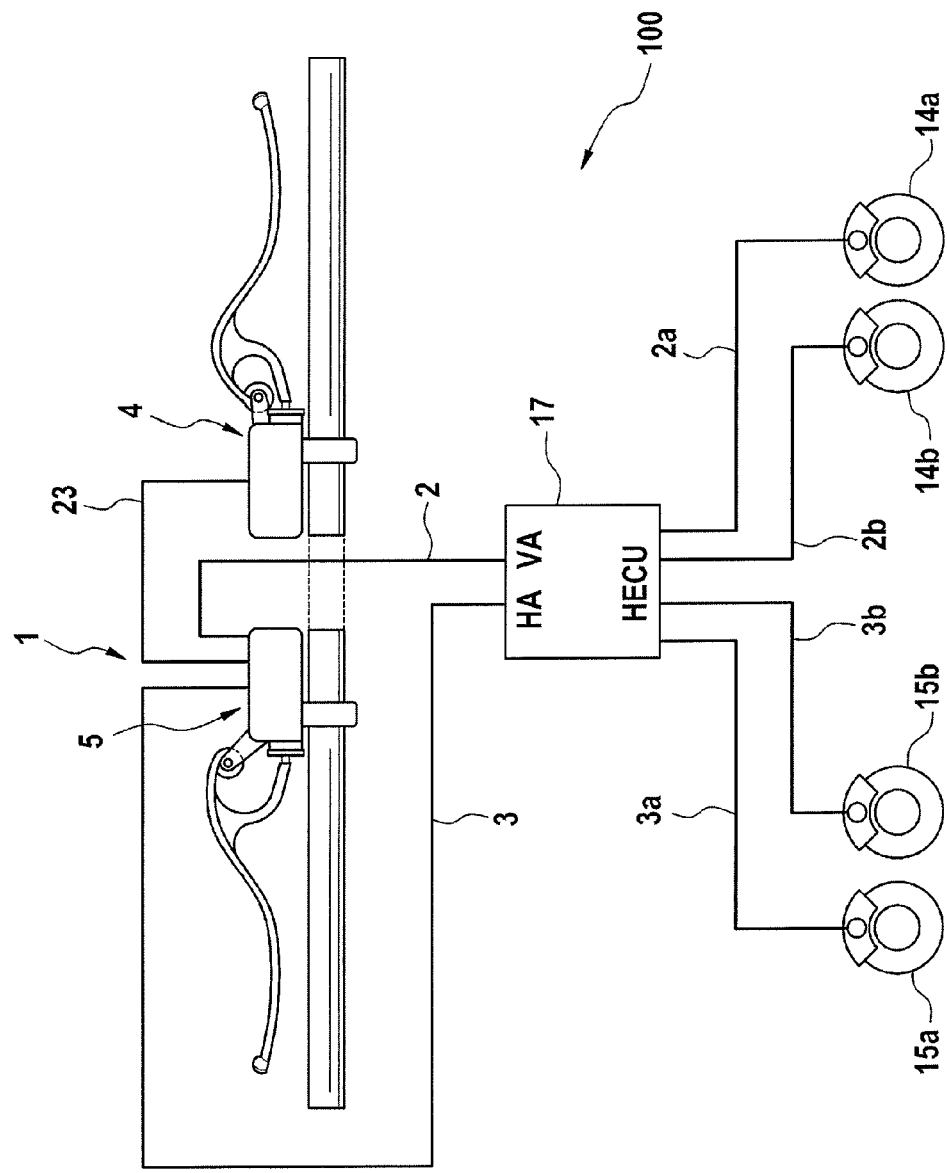
FIG. 5 a sketch of a further embodiment according to the invention with a tandem hand actuation facility for a four-wheeled vehicle (for example a quad bike) with an interposed hydraulic-electronic control unit, for example an ABS unit.

In contrast to the embodiment in FIG. 2, the further embodiment according to the invention shown here has a hydraulic-electronic control unit 17 interposed between the pressure chambers 10, 11 in the handbrake module 5 and the respective wheel brakes 14 and 15 in the two brake circuits 2 and 3, so that the wheel brakes 14 and 15 are not necessarily evenly controlled exclusively manually by the handbrake module 4 and/or combination handbrake module 5, but may also be set regulated electronically by the control unit 17. In this way, for example, an ABS control system can be implemented particularly easily on a two-wheeled vehicle.

FIG. 4

In three-wheeled vehicles such as for example trikes, the brake system 100 according to the invention can be adapted particularly easily, even without any structural changes to the brake actuation system 1, in that one of the brake circuits, for example the rear axle brake circuit 3, is divided in the control unit 17 into two partial brake circuits 3$a$ and 3$b$ which accordingly trigger the two rear wheel brakes 15$a$ and 15$b$, as the embodiment shows.

FIG. 5

An embodiment of the brake system 100 according to the invention for four-wheeled vehicles, such as for example quad bikes, is also easy to implement in that, in contrast to the embodiment described above, both brake circuits 2 and 3 are divided in the hydraulic-electronic control unit 17 into part brake circuits 2$a$, 2$b$ and 3$a$, 3$b$ respectively, connected to the individual front wheel brakes 14$a$, 14$b$ and rear wheel brakes 15$a$, 15$b$ respectively.

REFERENCE NUMERALS

1 Brake actuation system
2 Front axle brake circuit
3 Rear axle brake circuit
4 Handbrake module
5 Combined handbrake module
6 Actuating piston
7 Floating piston
8 Piston bore
9 Floor
10 Pressure chamber
11 Pressure chamber
12 Sealing collar
13 Sealing collar
14 Front wheel brake
15 Rear wheel brake
16 Stop
17 Hydraulic-electronic control unit
18 Hand lever
19 Housing
20 Cover
21 Sealing collar
22 Port
23 Hydraulic line
24 Pressure chamber
25 Piston
26, 26' Pressure medium reservoir
27 Handlebar
28, 28', 28" Elastic element
100 Brake system
B Actuation direction

The invention claimed is:

1. A brake actuation system of a hydraulic brake system, for actuating at least one front axle brake circuit with at least one front wheel brake and at least one rear axle brake circuit with at least one rear wheel brake, wherein the brake actuation system has at least one handbrake module which when actuated can activate both brake circuits, wherein the handbrake module is hydraulically connected to a combination handbrake module, and wherein the combination handbrake module is configured to generate a brake pressure in both brake circuits simultaneously, the combination handbrake module comprising a piston bore, an actuating piston arranged linearly displaceably in the piston bore, a hand lever coupled to the piston bore and configured to directly mechanically activate the actuating piston to generate the brake pressure in both brake circuits simultaneously, and at least one floating piston arranged linearly displaceably in the piston bore between a floor of the piston bore and the actuating piston.

2. The brake actuation system as claimed in claim 1, wherein the floating piston divides the piston bore into two pressure chambers which are each connected to a respective one of the front axle brake circuit and the rear axle brake circuit.

3. The brake actuation system as claimed in claim 2, wherein the floating piston has two direction-dependent sealing collars which are arranged spaced apart and oriented in the same direction, and the handbrake module is hydraulically connected to the combination handbrake module in a region between the sealing collars.

4. The brake actuation system as claimed in claim 2, wherein the floating piston is arranged elastically pretensioned against a stop in the direction of the actuating piston.

5. The brake actuation system as claimed in claim 1, wherein a hydraulic-electronic control unit is connected between the combination handbrake module and at least one wheel brake.

6. The brake actuation system as claimed in claim 5, wherein the combination handbrake module is hydraulically connected to more than one front wheel brake and/or rear wheel brake via the hydraulic-electronic control unit.

* * * * *